United States Patent [19]

Uchida et al.

[11] Patent Number: 5,742,909
[45] Date of Patent: Apr. 21, 1998

[54] TRANSMISSION OF DATA INDICATING DYNAMIC TRANSMISSION/RECEPTION PERIODS

[75] Inventors: Noriko Uchida; Akihiro Maebara; Ichiro Okajima; Katsumi Kobayashi; Masumi Kitagawa, all of Kanagawa, Japan

[73] Assignee: NTT Mobile Communications Network, Inc., Japan

[21] Appl. No.: 612,564

[22] Filed: Mar. 8, 1996

[30] Foreign Application Priority Data

Mar. 8, 1996 [JP] Japan ................................. 7-048809

[51] Int. Cl.[6] .......................... H04B 7/00; H04Q 7/00
[52] U.S. Cl. ...................... 455/517; 455/343; 455/38.3; 370/311
[58] Field of Search ................................. 455/38.3, 343, 455/68, 228, 231, 503, 507, 515, 524, 517; 340/825.44, 825.47; 379/57; 370/311, 314, 321, 337, 347

[56] References Cited

U.S. PATENT DOCUMENTS

| 4,449,248 | 5/1984 | Leslie et al. | 455/38.3 |
| 4,839,641 | 6/1989 | Mori et al. | 340/825.47 |
| 5,382,949 | 1/1995 | Mock et al. | 455/343 |
| 5,539,925 | 7/1996 | Yli-Kotila et al. | 455/38.3 |
| 5,613,208 | 3/1997 | Blackman et al. | 455/38.3 |

Primary Examiner—Reinhard J. Eisenzopf
Assistant Examiner—Lester G. Kincaid
Attorney, Agent, or Firm—George P. Hoare, Jr.; Rogers & Wells

[57] ABSTRACT

A mobile communication fixed station 101 transmits significant data to a mobile station 103 (104) after holding the significant data for a predetermined time, and no significant data are transmitted to the mobile station during that time. When there are no significant data which are being held, the fixed station 101 transmits remaining time data indicative of the predetermined time to the mobile station, and no significant data are transmitted to the mobile station. When significant data is being held, time data indicative of the remaining time until the start of transmission of the significant data is transmitted to the mobile station in each slot from the time significant data occurs until the time the significant data is transmitted. The fixed station 103, which has received the remaining time data stops receiving for a time interval corresponding to the remaining time.

9 Claims, 5 Drawing Sheets

| DATA AS TO EMPTY/OCCUPIED | NUMBER OF SEQUENTIAL EMPTY SLOTS | DATA |
|---|---|---|
| 501 | 502 | 503 |

A... OPERATION OF MOBILE COMMUNICATION FIXED STATION

B... RADIO CHANNEL

C... OPERATION OF RECEIVER OF MOBILE (TERMINAL) EQUIPMENT HAVING DISCRIMINATOR #1

D... OPERATION OF RECEIVER OF MOBILE (TERMINAL) EQUIPMENT HAVING DISCRIMINATOR #2

TRANSMISSION OF DATA INDICATING DYNAMIC TRANSMISSION/RECEPTION PERIODS

BACKGROUND OF THE INVENTION

This invention relates to a mobile communication system and a mobile station equipment in which a communication is performed with a person on the other end by performing a communication between a mobile station and a fixed station through a radio channel.

In a general mobile communication system, it is necessary for a mobile station to keep watch on the channel so as to be ready for receiving a signal transmitted from a network. The reason why the mobile station is required to keep watch on the channel is that there is no other way for the mobile station to know the presence or absence of a signal transmitted from the network and the timing of the signal to be transmitted. This is apparently inefficient in view of economy because electric power is consumed irrespective of the presence or absence of the signal.

Recently, the general mobile communication system widely employs a method in which the mobile station takes the leadership to determine a mobile location in order to determine a zone shifting, so that load for controlling the network can be dispersed. In this method, the level of a peripheral zone is measured by the mobile station. This peripheral zone level measurement is carried out such that a receiving channel of a receiver in the mobile station is switched over to a frequency of a level measuring channel for the peripheral zone. For this reason, the mobile station cannot receive any signal transmitted from the network during the time the measurement is undergoing. The result is that the quality of communication is deteriorated.

For the purposes of solving the above problem, two different kinds of proposals have been made; the first is that a level measurement specific receiver is employed in the mobile station in addition to a communication receiver, and the second is that a communication channel is provided with empty time for measuring the level so that the level can be measured utilizing the empty time.

However, in case the former proposal should be adopted, the mobile station would become larger compared with a case where a single receiver is employed and the consumption of electric power would also become great. In case the latter proposal should be adopted, the efficiency of use of a radio channel would be decreased because the time is fixedly set during which no signal can be transmitted from the network.

The present invention has been made in view of the problems inherent in the above-mentioned conventional techniques.

SUMMARY OF THE INVENTION

It is, therefore, an object of the present invention to provide a mobile communication system and method and a mobile station equipment in which a mobile station can receive a signal transmitted thereto without fail and is not obliged to engage in any receiving operation which is not necessary.

The present invention intends to solve the above problems by allowing the network to transmit data based on which the mobile station can determine the time during which the mobile station is not required to receive any signal. The subject matters of the present invention are as follows.

According to the invention, a mobile communication system and method are provided for performing a communication with a person on the other end by performing a communication between a mobile station and a fixed station through a radio channel, wherein:

the fixed station
a) transmits significant data to the mobile station with a delay when such significant data to be transmitted have occurred; and
b) also transmits time data, which indicate at least how long time is remained until the start of transmission of significant data, to the mobile station.

According to the invention, there is provided a mobile communication system for performing a communication with a person on the other end by performing a communication between a mobile station and a fixed station through a radio channel, wherein:

the fixed station
a) transmits significant data to the mobile station when such significant data to be transmitted have occurred, but only after holding the data for a predetermined time;
b) transmits time data indicative of the predetermined remaining time to the mobile station when no significant data are being transmitted to the mobile station and no significant data are being held; and
c) transmits time data indicative of the predetermined remaining time to the mobile station, when no significant data are being transmitted to the mobile station and some significant are being held.

According to the invention, there is provided a mobile communication system wherein the fixed station transmits significant data, which show whether or not significant data are being transmitted, to the mobile station.

According to the invention, there is provided a mobile communication system wherein the mobile station, which has received the time data indicative of the predetermined remaining time, stops a receiving operation for corresponding time to the predetermined remaining time.

According to the invention, there is provided a mobile communication system wherein the mobile station, which has received the time data indicative of the predetermined remaining time, measures a level of receiving field in a peripheral zone within corresponding time to the predetermined remaining time.

According to the invention, there is provided a mobile communication system wherein the time data includes; time data indicative of the predetermined remaining time.

According to the invention, there is provided a mobile communication system for performing a communication with a person on the other end by performing a communication between a mobile station and a fixed station through a radio channel, wherein:

a mobile communication system is characterized in that the number of bits is informed as the time data indicative of the predetermined remaining time.

According to the invention there is provided a Time Division Multiple Access (TDMA) type mobile communication system for performing a communication with a person on the other end by performing a communication between a mobile station and a fixed station through a radio channel, wherein:

a mobile communication system is characterized in that the number of slots is informed as the time data indicative of the predetermined remaining time.

According to the invention there is provided a TDMA type mobile communication system for performing a communication with a person on the other end by a plurality of mobile stations commonly using a single radio channel, wherein:

a mobile communication system is characterized in that the fixed station transmits the time data indicative of the predetermined remaining time, in a slot or slots to be assigned to a mobile station or a group of mobile stations to which the significant data are to be transmitted.

According to the invention there is provided a mobile communication system for performing a communication with a person on the other end by a plurality of mobile stations commonly using a single radio channel, wherein:

the fixed station transmits the following items to the mobile stations when significant data to be transmitted to a mobile station or a group of mobile stations has occurred;

a) a discriminator for identifying a mobile station or a group of mobile stations by which the significant data are to be duly received, and b) required-time data indicative of time required for transmitting the significant data.

According to the invention, there is provided a TDMA type mobile communication system for performing a communication with a person on the other end by a plurality of mobiles stations commonly using a single radio channel, wherein:

the fixed station transmits the required-time data in a first slot for starting the significant data.

According to the invention, there is provided a TDMA type mobile communication system for performing a communication with a person on the other end by a plurality of mobile stations commonly using a single radio channel, wherein:

a mobile communication system is characterized in that the fixed station transmits the required-time data in all slots which transmit the significant data.

According to the invention, there is provided a mobile communication system wherein:

the mobile station, which has received the discriminator and the required-time data, stops a receiving operation for corresponding time to the required-time data, when the discriminator indicates other mobile station or other group of mobile stations.

According to the invention, there is provided a mobile communication system wherein:

the mobile station, which has received the discriminator and the required-time data, measures a level of a receiving field in a peripheral zone within corresponding time to the required-time data, when the discriminator indicates other mobile station or other group of mobile stations.

According to the invention, there is provided a mobile station equipment in a mobile communication system for performing a communication with a person on the other end by performing a communication with a fixed station through a radio channel, wherein:

a period of time having no transmission of significant data addressed to the home mobile station based on a signal received from the fixed station is detected in order to stop a receiving operation during the period of time.

According to the invention, there is provided a mobile station equipment in a mobile communication system for performing a communication with a person on the other end by performing a communication with a fixed station through a radio channel, wherein:

a period of time having no transmission of significant data addressed to the home mobile station based on a signal received from the fixed station is detected in order to measure a level of receiving field in a peripheral zone during the period of time.

According to the mobile communication system, no significant data are transmitted during the time which is indicated by the remaining time data which are transmitted from the fixed station, and therefore, the mobile station can stop its receiving operation during that time. Similarly, the mobile station measures the level of a receiving field in the peripheral zone utilizing the time during which no significant data are transmitted from the fixed station.

The mobile station can know whether or not the data, which are transmitted by a fixed station, are addressed thereto and the time required for transmission. Accordingly, if the data are found to be addressed to other station, the mobile station can stop its receiving operation during the time the transmission of the data addressed to other station is undergoing. Similarly, the mobile station measures the level of a receiving field in the peripheral zone utilizing the time during which the transmission of the data addressed to other station from the fixed station is undergoing. Similarly, the mobile station stops its receiving operation by detecting the time during which no significant data addressed thereto are transmitted. Accordingly, the consumption of electric power can be saved without jeopardizing the receiving function. The mobile station measures the level of a field in the peripheral zone by detecting the time during which no significant data addressed thereto are transmitted. Accordingly, the measurement can be carried out without jeopardizing the receiving function.

DETAILED DESCRIPTION OF THE EMBODIMENT

Several embodiments of a mobile communication system will now be described with reference to the accompanying drawing.

<First Embodiment>

Figure 1:
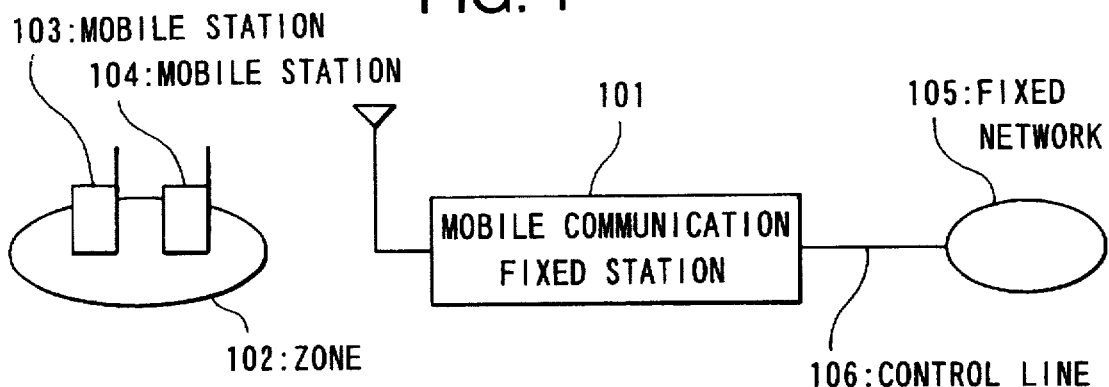
FIG. 1 is a schematic diagram showing a construction of a mobile communication system according to a first embodiment of the present invention.

FIG. 1 shows an overall construction of a mobile communication system according to a first embodiment of the present invention. In FIG. 1, reference numeral 101 denotes a mobile communication fixed station; 102, a zone covered by the mobile communication fixed station 101; 103, 104, mobile stations located in the zone 102; 105, a fixed network in communication with the mobile communication fixed station 101; and 106, a control line through which the mobile communication fixed station 101 communicates with the fixed network 105, respectively. The mobile communication system according to this embodiment carries out a communication between the fixed station and the mobile communication fixed station by way of each slot unit repeatedly appeared at a predetermined time length under the control of time division.

Figure 2:
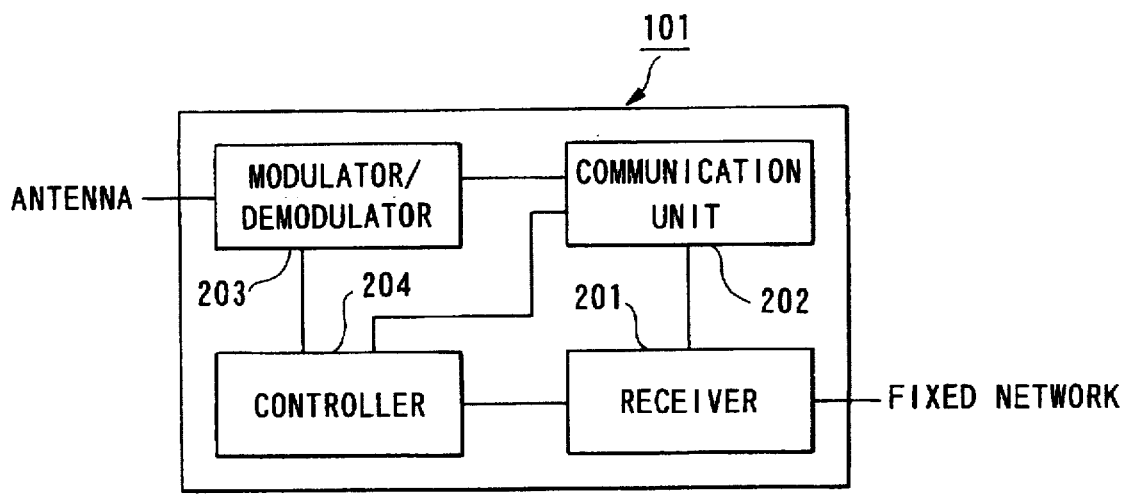
FIG. 2 is a block diagram showing a construction of the mobile communication fixed station 101 in the mobile communication system according to the first embodiment of the present invention.

FIG. 2 is a block diagram showing a construction of the mobile communication fixed station 101 in this embodiment. In FIG. 2, reference numeral 201 denotes a receiver for receiving a signal transmitted from the fixed network 105 through the control line 106. This receiver 201 has a memory (not shown) for storing the significant data from the fixed network 105 for a predetermined time. Reference numeral 202 denotes a communication unit for transmitted the significant data, which have been received and stored by receiver 201, to the mobile station 103; and 203, a modulator/demodulator for performing a communication through the mobile station 103 and a radio channel, respectively.

Reference 204 denotes a controller. The controller 204 performs the following controls.

a) to watch a receiving state of the receiver 201.

b) to set empty/occupied data indicative of whether a signal is transmitted to the mobile station using a radio channel in each slot.

c) to generate time data indicative of at least how long time is remained until the start of transmission of significant data when no transmission is undergoing.

The empty/occupied data and the remaining time data generated by the communication unit 202 are transmitted to the mobile stations 103, 104 through the communication unit 202 and the modulator/demodulator 203.

Figure 3:
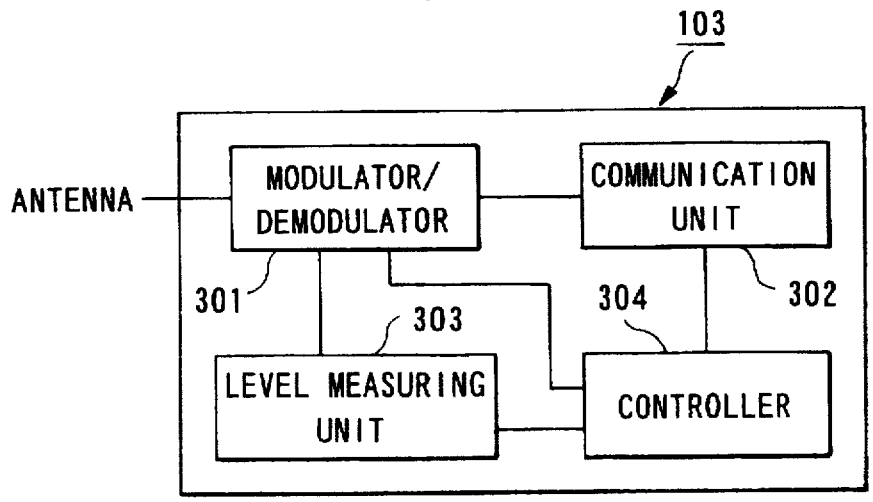
FIG. 3 is a block diagram showing a construction of the mobile station 103 in the mobile communication system according to the first embodiment of the present invention.

FIG. 3 is a block diagram showing a construction of the mobile station 103 (104) in this embodiment. In FIG. 3, reference numeral 301 denotes a modulator/demodulator for performing a communication with the mobile communication fixed station 101 through the radio channel; 302, a communication unit for receiving a signal from the mobile communication fixed station 101; and 303, a level measuring unit for measuring the level, respectively. Reference numeral 304 denotes controller for performing a receiving control based on the empty/occupied data contained in the received signal using the communication unit 302.

Figure 4:
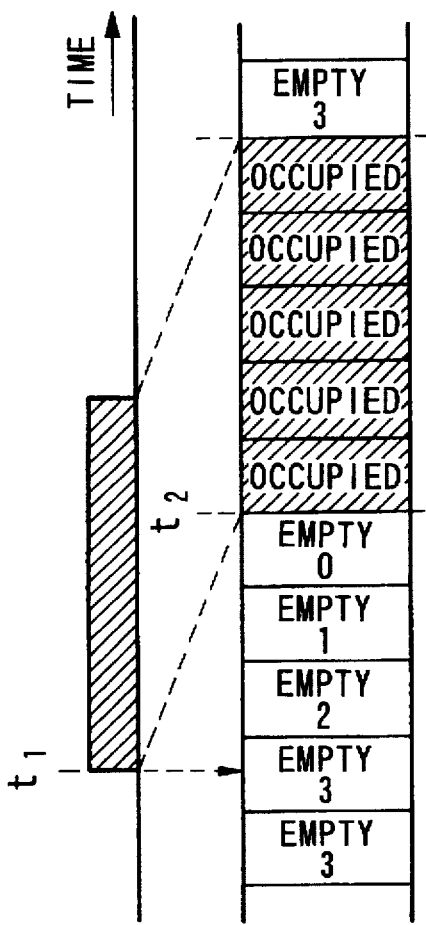
FIG. 4 is a chart diagram showing the operation of the mobile communication fixed station 101 and the mobile station 103 according to the first embodiment of the present invention.
Figures 5, 6:
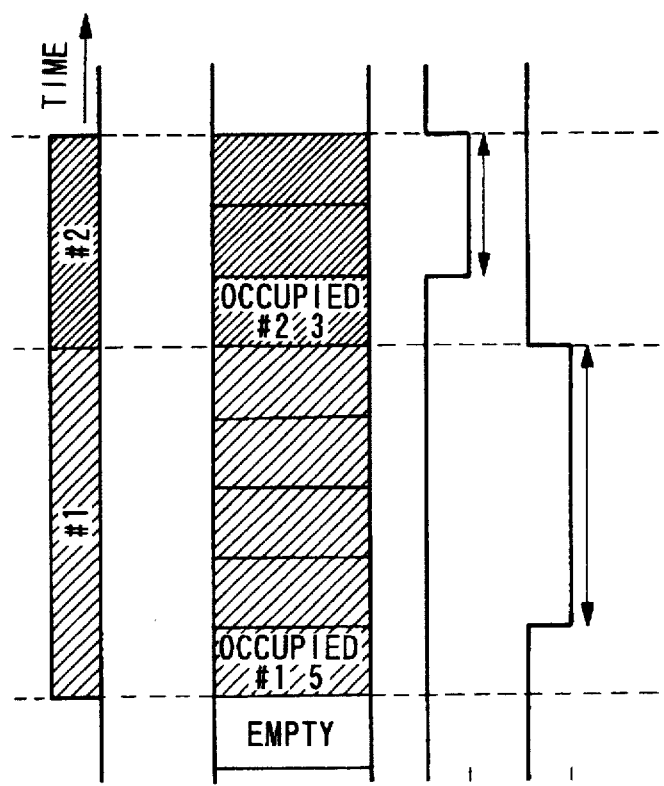
FIG. 5 is a representation of a construction of data which are to be transmitted in each slot by the mobile communication fixed station 101.
FIG. 6 is a chart diagram showing the operation of a mobile communication fixed station 101 and mobile stations 103, 104 in a mobile communication system according to a second embodiment of the present invention.

FIG. 4 is a time chart showing the operation of the mobile communication fixed station 101 and the mobile station 103 of the mobile communication system according to this embodiment. In this Figure, A shows a time series indicative of presence/absence of a signal in the mobile communication fixed station 101, the hatched portion representing a time zone in which a signal to be transmitted to the mobile station is received from the fixed network 105. Similarly, B shows a state of use of each slot, and C through G show operations of the mobile station. FIG. 5 shows the content of data transmitted from the mobile communication fixed station 101 in each slot of the radio channel.

Operation of the mobile communication system according to this embodiment will now be described with reference to FIGS. 4 and 5.

In each slot, the mobile communication fixed station 101 transmits the data shown in FIG. 5. In this Figure, reference numeral 501 denotes empty/occupied data; 502, remaining time data; and 503, significant data having one or other meaning, respectively. Here, the empty/occupied data 501 are data indicative of whether or not the specific slot is occupied. In case the transmission of significant data is not undergoing utilizing the specific slot, empty data indicative of the specific slot being empty transmitted as the empty/occupied data 501, whereas in case the transmission of the significant data 503 is under going, occupied data indicative of the specific slot being occupied are transmitted as the significant data. In FIG. 4B, there are shown a slot with a legend "EMPTY" and a slot with a legend "OCCUPIED". The former is a slot in which empty data are being transmitted as the empty data 501, and the latter is a slot in which occupied data are being transmitted as the occupied data.

The remaining time data 502 are data indicative of at least how many slots there are, which slots represent the remaining time until the start of transmission. The remaining time data 502 are transmitted when the empty data are transmitted as the empty/occupied data 501. In FIG. 4B, one of the numerical FIGS. 0 through 3 is marked in each slot which has the legend "OCCUPIED". Those numerical figures show the content of the remaining time data to be transmitted in each slot. The remaining time data 502 in the present application are not limited to those data in which the remaining time until the start of transmission is represented by the number of slots. Instead, the remaining time data 502 may be those which directly show the numerical value no matter whether they are an analog value or digital value, for example. In a communication system in which the number of bits to be transferred in a single slot is fixed as in the case where data of 280 bits are transmitted in a single slot, those data, in which the remaining time until the start of transmission is represented by the number of bits, may be used as the remaining time data 502. The important things here are that the time data are data indicative of the remaining time until the start of transmission and that they are appropriate for a mobile communication system to which the present invention is applied.

Now, in this embodiment, when the mobile communication fixed station 101 has received a signal which is to be transmitted to the mobile station 103 (104) from the fixed network 105, it temporarily holds the signal instead of immediately transmitting the signal. Then, after the passage of three slots, the mobile communication fixed station 101 transmits the signal. Therefore, in case there is no signal which is to be transmitted to the mobile station, no transmission to the mobile station is started for an interval of at least three slots from the current time point. During that time, the radio channel is remained in an empty state. For this reason, in each slot in which no signal to be transmitted to the mobile station is generated, empty data as the empty data 501 and the number "3" of slots as the remaining time data are transmitted.

Here, as shown in FIG. 4A, presume that a signal to be transmitted to the mobile station 103 has occurred at a certain time $t_1$ and the signal thus generated has been transmitted from the fixed network 105 to the mobile communication fixed station 101. In this case, the mobile communication fixed station 101 buffers the signal received from the fixed network 105. Further, the mobile communication fixed station 101 finds the number of slots until the start of transmission of the signal so as to prepare remaining time data. Then, the mobile communication fixed station 101 sets the empty/occupied data to empty data and transmits those data to the mobile station. That is, as shown in FIG. 4B, in a slot to which the time $t_1$ belongs, since no transmission is started during the interval of three slots after that time, data "3" are transmitted as the remaining time data. In each slot after the slot to which the time $t_1$ belongs, the remaining time data to be transmitted to the mobile station are gradually reduced by "1" every time the slot is switched from one to another. Then, the transmission of a signal is started (time $t_2$) from the next slot to the slot in which the remaining time data became "0".

On the other hand, in the mobile station 103, a receiving control is carried out based on the empty/occupied data and the remaining time data. That is, the mobile station 103 turns on the receiver to receive a signal transmitted from the mobile communication fixed station 101. If the empty/occupied data contained in the receiving signal are found to be the occupied data, the mobile station 103 receives the significant data. In contrast, if the empty/occupied data are found to be the empty data, the mobile station 103 tries to obtain an answer as to "at least how many slots it is after the current time point, during which interval no signal will be transmitted from the mobile communication". Then, the mobile station 103 turns off the power of the receiver for the time corresponding to the number of slots thus obtained. FIGS. 4C through 4G show some examples of such operation.

First, in the example of operation shown in FIG. 4C, the power of the receiver of the mobile station is turned on at the first slot (left-hand side slot in the Figure) shown in the Figure. Since the empty data and the remaining time "3" data are being transmitted in this time slot, the mobile station causes the power of the receiver to be in the OFF-state during the interval of three slots after that time point. When the power of the receiver is turned on again after the passage of three slots, the mobile station receives the empty data and the remaining time "0" data. Based on the remaining time "0" data, the mobile station detects a fact that a signal will be transmitted from the mobile communication fixed station 101 in the next time slot. Then, the mobile station turns on the power of the receiver in the next time slot and receives the significant data transmitted from the mobile communication fixed station 101. During the period the significant data are being transmitted from the mobile communication fixed station 101, the occupied data are being transmitted together with the significant data. During the period the occupied data are being transmitted, the mobile station receives the significant data sequentially instead of intermittently. When the transmission of the significant data are over, the empty data and the remaining time data are transmitted again from the mobile communication fixed station 101. This causes the mobile station again to resume the abovementioned intermittent receiving operation.

Next, in the example of operation shown in FIG. 4D, when the mobile station turns on the power of the receiver to receive a signal, it receives the occupied data as the empty/occupied data. Consequently, the mobile station starts receiving the significant data from that time point.

Next, in the example of operation shown in FIG. 4E, when the mobile station turns on the power of the receiver to receive a signal, it receives the remaining time "2" data as the empty data. Consequently, the mobile station causes the power of the receiver to be in the OFF-state for the interval of two slots from that time point and starts receiving the significant data at the first slot after the passage of two slots. The same is true to the example of operation of FIG. 4F. In the example of operation shown in FIG. 4F, when the mobile station has received the remaining time "1" data, it causes the power of the receiver to be in the OFF-state for an interval of two slots.

When no signal to be transmitted to the mobile station occurs, the numbers "3" of slots are sequentially transmitted as the remaining time data in each slot of the radio channel. Therefore, the mobile station turns off the power of the receiver after it has received the remaining time "3" data. Then, after the passage of three slots, the mobile station turns on the power of the receiver again. If any signal to be transmitted to the mobile station occurs during the period the power of the receiver is held in the OFF-state, the mobile station carries out one of the operations of FIGS. 4C through 4F to receive the significant data. In contrast, if no signal to be transmitted to the mobile station occurs during that period, the mobile station receives the remaining time "#3" data again and causes the power of the receiver to be in the OFF-state for the interval of three slots. Those procedures are performed repeatedly.

As in the example of operation shown in FIG. 4G, there is a possibility that in the mobile station, the remaining time "0" data are received in the slot in which the power source is held in the ON-state. In that case, the mobile station starts receiving the significant data at the first slot after the slot in which the power source is held in the ON-state.

In the embodiment so far described, the receiver (modulator/demodulator 301 and communication unit 302) is stopped in the slot time during which the empty data are being received. In the alternative, instead of stopping the receiver, the receiving level of the peripheral zone may be measured by switching the receiving frequency of the modulator/demodulator 301 to each frequency of the peripheral zone. Similarly, although the empty/occupied state of the slot or slots is determined based on the empty/occupied data, it is also acceptable that the empty-occupied state of the slot or slots is expressed, for example, by the remaining time data and the receiving operation is controlled based on only the remaining time data.

<Second Embodiment>

In this embodiment, the present invention is applied to a mobile communication system in which a plurality of mobile stations commonly use a single radio channel. More specifically, heretofore, in a mobile communication system of this type, there are such inconveniences that the mobile stations are obliged to keep performing the receiving operation even during the time the mobile communication fixed station is transmitting a signal to other mobile station because a specific mobile station cannot know when a signal will be transmitted to the home mobile station from the mobile communication fixed station. This embodiment resolves such inconveniences. A basic construction of a mobile communication system according to this embodiment is the same as the first embodiment and only the specific control operation made by each component element is different from the first embodiment. Therefore, FIGS. 1 through 3 used for explaining the first embodiment are again used for this second embodiment, and only those portions different from the first embodiment will be described.

(1) Mobile Communication Fixed Station

The controller 204 (FIG. 2) in the mobile communication fixed station performs the following controls, aside from its function for watching the receiving state of the receiver 201 as in the case with the first embodiment.

a) to control the empty/occupied data indicative of an empty/occupied state of the receiver 201.

b) to control the generation of a discriminator for identifying a mobile station by reading the addressee of a signal transmitted from the fixed network 105 and received by the receiver 201.

c) to control the determination of the number of occupied slot or slots necessary for transmitting the signal to the mobile station based on the length of a signal received from the fixed network 105.

The above-mentioned respective data generated by the controller 204 are transmitted to the mobile station through the communication unit 202 and the modulator demodulator 203.

(2) Mobile Station

The controller 304 (FIG. 3) of the mobile station performs the following controls.

a) The empty/occupied data, the discriminator and the number of occupied slots, which are all contained in the received signal are read using the communication unit 302.

b) In case the empty/occupied data are the occupied data indicative of the fact that a signal is being transmitted utilizing the current slot, a receiving control is performed based on the discriminator and the number of occupied slots. That is, in case the discriminator is addressed to the specific mobile station (home mobile station), the receiver is actuated to receive a signal from the mobile communication fixed state for the time interval corresponding to the number of occupied slots. In contrast, in case the discriminator is addressed to other mobile station, the receiving operation is stopped for the time interval corresponding number of the occupied slots.

Figure 7:
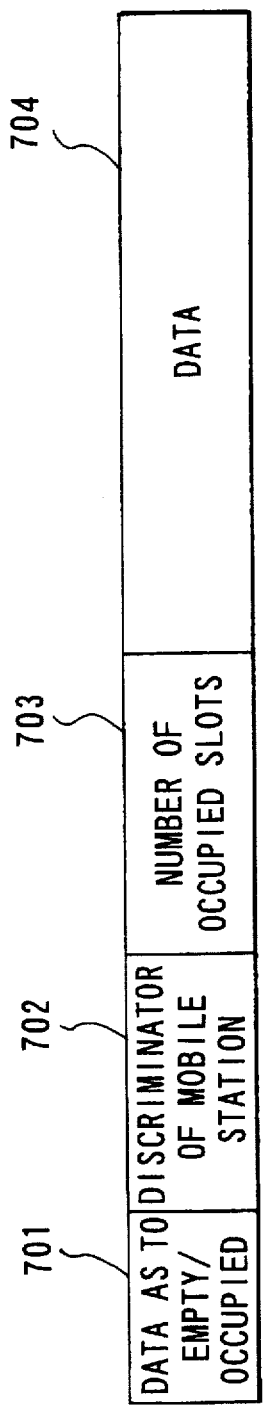
FIG. 7 is a representation of a construction of data which are to be transmitted in each slot by the mobile communication fixed station 101 according to the second embodiment of the present invention.
Figure 8:
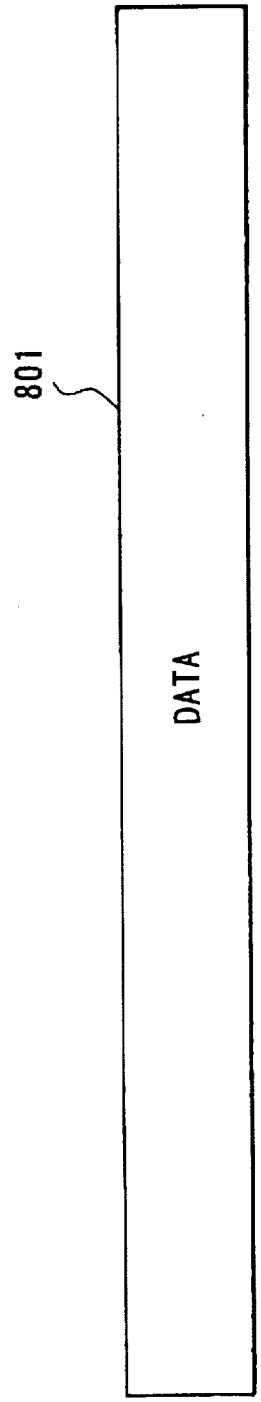
FIG. 8 is a representation of a construction of data which are to be transmitted in each slot by the mobile communication fixed station 101 according to the second embodiment of the present invention.

FIG. 6 shows the operations of the mobile communication fixed station 101 and the mobile station 103 in this embodiment. In FIG. 6, A shows the present or absence of a signal from the mobile communication fixed station 101 in time series. In this Figure, "#1" and "#2" show discriminators of a mobile station as a counterpart of the transmission. Similarly, B shows a state of use of the radio channel in each slot. The upper legends such as "EMPTY" and "OCCUPIED" indicate the empty/occupied data which are being transmitted in that slot; "#1" and "#2", discriminators; and the lower numerical figures, the number of occupied slots, respectively. C and D show the examples of operation of the mobile stations 103 and 104, respectively. FIG. 7 shows a construction of a signal to be transmitted in the leading slot when a signal to be transmitted to the mobile station 103 has occurred in this embodiment. As shown in this Figure, in the leading slot, empty/occupied data 701, a mobile station discriminator 702, the number of occupied slots 703 and significant data 704 are transmitted. FIG. 8 shows a construction of a signal to be transmitted in a slot after the second slot when a signal to be transmitted to the mobile station 103 is present. As shown in this Figure, only the significant data 801 are transmitted in slots after the second slot.

Operation of the mobile communication system according to this embodiment will now be described with reference to FIGS. 6 through 8.

In the mobile communication fixed station 101, when the significant data obtained from the fixed network 105 are to be transmitted to the mobile station 103, the respective data shown in FIG. 7 are transmitted in the leading slot in which the transmission of the significant data is started. More specifically, the occupied data indicating that the specific slot is occupied are served as the empty/occupied data 701. The discriminator identifying a mobile station and the occupied slot number 703 for sending a signal to the mobile station are transmitted together with the empty/occupied data 701. Then, only the significant data 801 of FIG. 8 are transmitted at the second slot and slots thereafter. In each slot, if no signal to be transmitted to the mobile station is present, the empty data indicating that the specific slot is empty are served as the empty/occupied data 701. The empty/occupied data 701 are transmitted to the mobile station through the radio channel.

On the other hand, in case the empty/occupied data 701 contained in the receiving signal are occupied data and the discriminator 702 is a discriminator indicating the home mobile station, the mobile stations 103 and 104 receive the signal from the mobile communication fixed station 101 for the time interval corresponding to the slot number 703 contained in the receiving signal. In case the discriminator 702 contained in the receiving signal is not a discriminator indicating the home mobile station, the operation of the receiver is stopped for the time interval corresponding to the slot number 103. FIGS. 6C and 6D show the examples of operation in case the discriminators of the mobile stations 103 and 104 are "#1" and "#2", respectively. In case the received empty/occupied data are the empty data, the signal is discarded and the next slot is received.

In the embodiment so far described, the discriminator indicates a single mobile station. In the alternative, an arrangement is possible in that a group is preliminarily formed by a plurality of mobile stations and the group of mobile stations is designated by the discriminator. Also, when the signal from the fixed network 105 is to be transmitted to the mobile station 103, only the leading slot is designed to have the construction of FIG. 7. In the alternative, the data shown in FIG. 7 may be transmitted in all the slots. In this case, in each slot, the mobile communication fixed station transmits the number of slots after the specific slot of all the occupied slots for transmitting a signal as an occupied slot number. Owing to this arrangement, since a mobile station, which has accessed in the slot in which a signal is still being transmitted, can know how long the transmission will be continued from that time point after the specific slot, the similar control to the above can be obtained.

Also, in the above-mentioned embodiment, the mobile station keeps stopping the operation of the receiver for the time period during which no transmission addressed to the home mobile station is made. Alternatively, during that time period, the receiving level of the peripheral zone may be measured by switching the frequency for each peripheral zone.

In the above-mentioned first and second embodiments, an example of a communication system has been described in which the slots are used in a sequential manner. However, the present invention is not limited to this. It may likewise be applicable to the TDMA system in which each slot constituting a frame is used as a radio channel. In case the present invention is applied to such a communication system, the mobile station can carry out the operation according to the first or second embodiment only in the slot assigned to the home mobile station.

Figure 9:
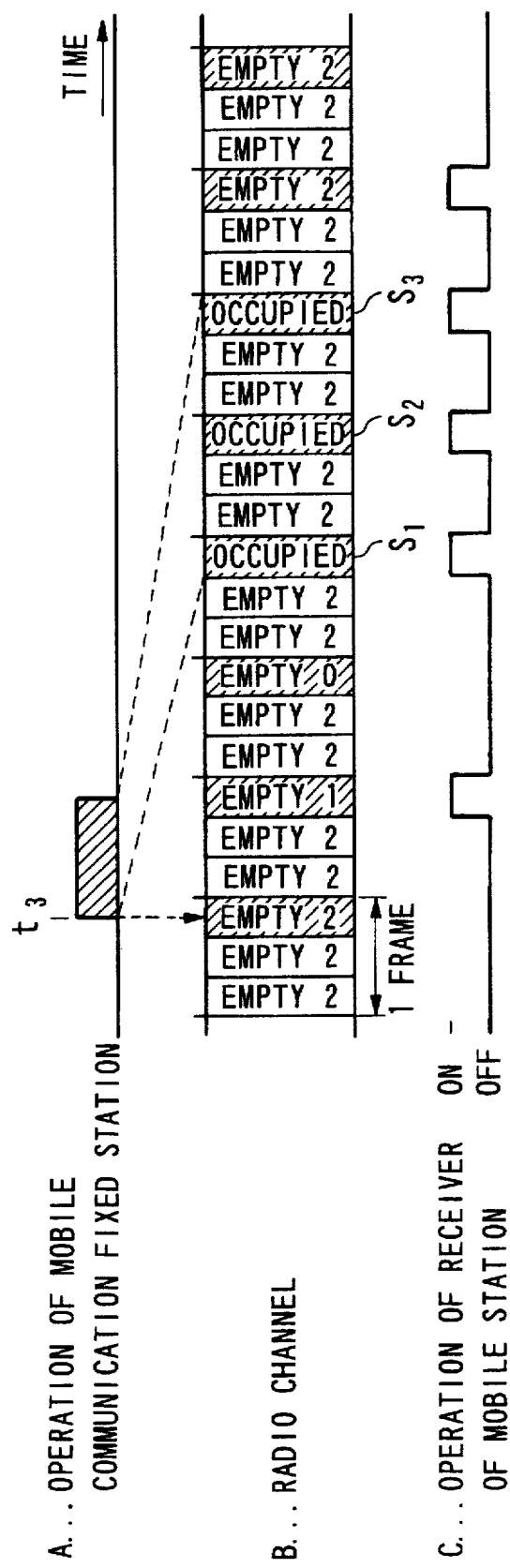
FIG. 9 is a chart diagram showing the operation of the mobile communication fixed station 101 and the mobile station 103 in a mobile communication system according to a modified embodiment of the present invention.

FIG. 9 is an illustration showing an example of operation when a construction of a radio channel in which three slots constitute a frame is applied to the mobile communication system according to the first embodiment. In this Figure, the slot having the radio channel of B applied with hatching shows the slot to be assigned to the mobile station of C. It should be noted that in this example, in case no signal to be transmitted to the mobile station is present, the number of slots, which will be in an empty state from the current time, is arranged as "2".

As shown in FIG. 9A, presuming that a signal to be transmitted to a mobile station occurs at a certain time $t_3$ and this signal is sent from the fixed network 105 to the mobile communication fixed station 101, the mobile communication fixed station 101 buffers the signal received from the fixed network 105 and obtains the number of slots until the start of transmission of this signal. Then, the mobile communication fixed station 101 sets the empty/occupied data to the empty data and transmits those data by way of the slots assigned to the specific mobile station in the frame. In each slot after the slot to which the time $t_3$ belongs and which is assigned to the specific mobile station in a single frame, the remaining time data to be transmitted to the mobile station are decreased, one by one, every time the slot is switched from one to another. In the slots $S_1$ through $S_3$ which are next to the slot in which the remaining time becomes "0" and which are assigned to the specific mobile station in a single frame, the buffered signals are gradually transmitted.

On the other hand, in the mobile station, the receiving control is carried out based on the empty/occupied data and the remaining time data. As shown in FIG. 9C, the receiving timing is established such that the receiving operation is performed by only the slots assigned to the home mobile station in the frame.

As described in the foregoing, according to the present invention, since the time can be determined during which the mobile station is not obliged to receive any signal, based on data from the network, those receiving operations which are deemed to be unnecessary in the mobile station can be eliminated while carefully preventing any accidental non-receipt of significant data. Thus, the consumption of electric power in the mobile station can be reduced. Furthermore, in case the receiving level in the peripheral zone during the time interval when the slot or slots are held in an empty state, a receiver specially designed for measuring the level and a measuring slot is no more required, thus enabling to make the mobile station small in size. In addition, deterioration of efficient use of the radio channel can be prevented.

What is claimed is:

1. A data transmission method for indicating dynamic transmission/reception periods in a data transmission from a fixed station to a mobile station through a radio channel comprised of a sequence of slots, comprising:

said fixed station performing the steps of:
(a) transmitting significant data to said mobile station after delaying by a number of slots once such significant data to be transmitted has occurred; and
(b) also transmitting remaining time data, which indicate at least how many slots are remaining until the time significant data are transmitted, in each slot from the time the significant data to be transmitted occurs until the time the significant data are transmitted, and;

said mobile station performing the steps of:
(c) receiving the remaining time data at a frequency of once for the number of slots equal to or less than a predetermined number of slots, and
(d) also receiving the remaining time data or significant data in the slot which comes after the passage of a the number of slots indicated by the received remaining time data.

2. A data transmission method for indicating dynamic transmission/reception periods according to claim 1, wherein the step of said fixed station transmitting said predetermined number of slots as time data, is performed when no significant data to be transmitted to said mobile station occurs and when no transmission of significant data is performed.

3. A data transmission method for indicating dynamic transmission/reception periods according to claim 1 or 2, further comprising the step of:

transmitting, by said fixed station significant data, which show whether or not significant data are being transmitted to said mobile station.

4. A data transmission method for indicating dynamic transmission/reception periods according to claim 1 or 2, wherein said mobile station, which receives the remaining time data indicative of a predetermined remaining time, further performs the step of:

stopping a receiving operation for a time corresponding to the number of slots indicated by the remaining time data.

5. A data transmission method for indicating dynamic transmission/reception periods according to claim 1 or 2, wherein said mobile station, which receives the time data indicative of said predetermined remaining time, further performs the step of:

measuring a level of a receiving field in a peripheral field in a peripheral zone within a time corresponding to the number of slots indicated by the remaining time data.

6. A data transmission method for indicating dynamic transmission/reception periods according to claim 1 or 2, wherein the data transmission is performed in a time division multiple access (TDMA) system in which a plurality of slots constitute one frame and a different mobile station is assigned to each slot, wherein the remaining time data, transmitted by said fixed station, indicative of a predetermined remaining time, is transmitted in a slot or slots assigned to a mobile station or a group of mobile stations to which said significant data are to be transmitted.

7. A data transmission method for indicating dynamic transmission/reception periods according to claim 1 or 2, wherein said radio channel is commonly used by a plurality of mobile stations, and said fixed station, further performing the step of:

transmitting significant data, when time arises, to each mobile station, together with a discriminator for identifying a mobile station or a group of mobile stations by which said significant data are to be received.

8. A data transmission method for indicating dynamic transmission/reception periods according to claim 7, wherein the data transmission is performed in a time division multiple access (TDMA) system in which a plurality of slots constitute one frame and a different mobile station is assigned to each slot, and said fixed station performs the step of transmitting said remaining time data in the first slot which starts transmission of said significant data.

9. A data transmission method for indicating dynamic transmission/reception periods according to claim 7, wherein the data transmission is performed in a time division multiple access (TDMA) system in which a plurality of slots constitute one frame and a different mobile station is assigned to each slot, and said fixed station performs the step of transmitting said remaining time data in all slots which transmit said significant data.

\* \* \* \* \*